United States Patent [19]

Sancier

[11] Patent Number: 4,777,030

[45] Date of Patent: * Oct. 11, 1988

[54] PROCESS FOR RECOVERY OF SILICON FROM A REACTION MIXTURE

[75] Inventor: Kenneth M. Sancier, Menlo Park, Calif.

[73] Assignee: Enichem, S.p.A., Milan, Italy

[*] Notice: The portion of the term of this patent subsequent to Apr. 2, 2004 has been disclaimed.

[21] Appl. No.: 758,595

[22] Filed: Jul. 24, 1985

[51] Int. Cl.$^4$ .............................................. C01B 33/02
[52] U.S. Cl. .................................... 423/348; 423/163; 423/185; 423/197; 423/202; 423/658.5
[58] Field of Search ...................... 423/348, 185, 658.5, 423/197, 202, 163, 349, 350

[56] References Cited

U.S. PATENT DOCUMENTS

| | | | |
|---|---|---|---|
| 4,241,037 | 12/1980 | Pelosini et al. | 423/348 |
| 4,442,082 | 4/1984 | Sanjurjo | 423/350 |
| 4,539,194 | 9/1985 | Halvorsen | 423/348 |
| 4,655,827 | 4/1987 | Sanjurjo et al. | 423/350 |

OTHER PUBLICATIONS

Hackh's Chemical Dictionary, Grant, 1972, p. 381.
Mellor, Comprehensive Treatise on Inorganic and Theoretical Chemistry, vol. III, 1946, pp. 688–689.
Fundamentals of Analytical Chemistry, Skoog et al., 1963, pp. 728–730.

Primary Examiner—John Doll
Assistant Examiner—Lori Freeman
Attorney, Agent, or Firm—Hedman, Gibson, Costigan & Hoare

[57] ABSTRACT

A process is described for the recovery of silicon from a reaction mixture comprising silicon and an alkali metal fluoride.

9 Claims, No Drawings

PROCESS FOR RECOVERY OF SILICON FROM A REACTION MIXTURE

BACKGROUND OF THE INVENTION

The reaction of an alkali metal and silicon tetrafluoride to form elemental silicon has been described in U.S. Pat. No. 4,442,082 and in Final Report "Novel Duplex Vapor—Electrochemical Method for Silicon Solar Cells," March 1980, both of which are incorporated by reference. Generally the reaction may be carried out in a suitable reactor by directly contacting silicon tetrafluoride with an alkali metal such as sodium. In such a reaction, the reaction product consists essentially of a mixture of sodium fluoride and silicon. This mixture may be separated by aqueous leaching using acidic solutions to neutralize any unreacted sodium and to decrease the spontaneous oxidation of silicon that occurs rapidly in alkaline solutions.

It is known that the presence of soluble fluoride increases the amount of silicon that is lost by oxidation. This phenomenon is discussed in J. Electrochem. Soc. Vol. 127, No. 8, pp 1848-1851 (1980) wherein data is given which shows that the rate of oxidation of silicon, as measured by the evolution of hydrogen, is accelerated by the fluoride ion.

The applicant has discovered that the addition of an alkaline earth metal chloride to the leaching bath will substantially reduce the oxidation of the silicon and thus increases the yield of silicon by rapidly converting the soluble fluoride ion to a substantially completing insoluble form. It has been discovered that the use of this technique increases the rate of leaching and aids in the reduction of aluminum impurities in the silicon by co-precipition with the insoluble fluoride. The evolution of hydrogen gas is also suppressed which eliminates a safety hazard and avoids the formation of foam in the leaching stages that interferes with filtration. The cost of recovery of the silicon is also reduced because (1) the sodium fluoride in the reaction mixture dissolves more rapidly, (2) less silicon is oxidized, and (3) fewer leaching steps are required. Accordingly, it is a primary object of this invention to provide an improved method for the recovery of silicon from a reaction mixture comprising silicon and an alkali metal fluoride.

It is also an object of this invention to provide an improved method for the recovery of silicon from a reaction mixture comprising silicon and alkali metal fluoride that reduces the loss of silicon caused by oxidation.

These and other objects of the invention will become apparent from a review of the present specification.

DETAILED DESCRIPTION OF THE INVENTION

The invention comprises a process for the recovery of silicon from a reaction mixture that comprises silicon and an alkali metal fluoride. The process is based on the leaching of said reaction mixture with aqueous alkaline earth metal chloride. The aqueous leaching in the presence of an alkaline earth metal chloride such as calcium chloride, barium chloride or magnesium chloride results in the formation of a substantially insoluble alkaline earth metal fluoride that is easily separated from the elemental silicon. The separations may be carried out very efficiently because the insoluble alkaline earth metal fluorides do not adhere to or form cohesive masses that interfere with the separation of the silicon from said insoluble alkaline earth metal fluoride.

The aqueous alkaline earth metal chloride leaching solution should be acidified with an acid. A sufficient amount of acid should be utilized to achieve a pH of less than 7.0 in the leaching solution. A preferred pH range is from 1 to 2. Suitable acids include hydrochloric, nitric, perchloric, hydroiodic and hydrobromic. The preferred acid is hydrochloric. Acids such as sulfuric and phosphoric should be avoided because the phosphate and sulfate ions may be carried over as insoluble alkali metal salts into the separated silicon. Generally, reagent grade or better acids should be used to avoid introducing any impurities into the silicon.

A stoichiometric excess of the alkaline earth metal chloride, based on the amount of fluoride that is present, should preferably be utilized in order to provide that all of the soluble fluoride ion will be converted to insoluble fluoride ion. Generally a molar ratio of from 0.9:1 to 1.3:1 or more preferably from 1.05:1 to 1.1:1 of alkaline earth metal chloride to alkali metal fluoride may be utilized. The use of a large excess of alkaline earth metal chloride should be avoided because the level of impurities introduced will be directly proportional to the amount of the alkaline earth metal chloride that is utilized.

The alkaline earth metal chloride is preferably added as a concentrated or dilute aqueous solution. Generally, from 5% by weight to a saturated solution may be utilized. The aqueous solution may be added all at once or in divided amounts. The preferred alkaline earth metal chloride is calcium chloride. Refined grades are preferred although commercial grades that are free of transition metals may be utilized.

DESCRIPTION OF THE PREFERRED EMBODIMENTS

EXAMPLE 1

To 5.0 g of a reaction product containing silicon and sodium fluoride obtained by reacting sodium and silcon tetrafluoride (14.3% theoretical weight of silicon) is added 150 ml of calcium chloride solution containing 13.8 g of calcium chloride and 0.3 g of concentrated hydrochloric acid. After the solution is combined with the mixture of silicon and sodium fluoride, the amount of hydrogen generated in a closed system as described in J. Electrochemical Soc. Vol. 127 No. 8 pp 1848-1851 (1980), was determined as a basis for the estimation of the amount of silicon that was oxidized. After 5 hours, a total of 0.67% by weight of the silicon was oxidized.

To compare the efficiency of the use of aqueous calcium chloride with the prior art use of aqueous sulfuric acid, leaching was carried out using 4 ml; 2.5 ml; 2 ml; and 1 ml of concentrated sulfuric acid in 150 ml of water as a leaching agent.

It was found that after 5 hours, 0.17%; 0.58%; 1.4% and 2.5% by weight, respectively, of the silicon was oxidized.

This data shows that the rate of oxidation of the silicon is reduced as increasing amounts of acid are used. The greater efficiency of calcium chloride for this purpose is shown by the data which shows that five times more sulfuric acid than calcium chloride is required to achieve an equivalent decrease in the quantity of silicon lost through oxidation.

EXAMPLE 2

To 156 g of a reaction product which consists of silicon and sodium fluoride in chunks no larger than 1" in diameter is added a 95% by weight calcium chloride solution and 4 liters of water containing concentrated hydrochloric acid (1.0 ml) which is added to achieve a pH of about 1. After the reaction product is added, an additional 12 ml of concentrated hydrochloric acid is required to adjust the pH to about 1.2. No foaming is observed which indicates that no hydrogen is evolved and hence no oxidation is taking place. The slurry is stirred for about 2 hours to aid in dissolving the sodium fluoride. After the stirring is stopped, the silicon settles as a black layer. The mixture is centrifuged under conditions that separate solid silicon but maintain substantially all of the calcium fluoride as a suspended solid in the leaching liquid because of the different settling rates. The mixture is washed with water seven times and about 3.5% by weight of calcium fluoride (by arc emission spectrographic analysis) remains with the silicon. The residual calcium fluoride may be removed as slag when the silicon is melt consolidated in the preparation of a single crystal using Czochralski crystal growing technology.

I claim:

1. A method for the recovery of silicon from a reaction mixture comprising silicon and an alkali metal fluoride, said method comprising leaching said alkali metal fluoride with an aqueous solution of an alkaline earth metal chloride.

2. A method for the recovery of silicon from a reaction mixture comprising silicon and an alkali metal fluoride as defined in claim 1 wherein the alkaline earth metal chloride is selected from the group consisting of calcium chloride, magnesium chloride and barium chloride.

3. A method for the recovery of silicon from a reaction mixture comprising silicon and an alkali metal fluoride as defined in claim 2 wherein the alkali metal fluoride is sodium fluoride and the alkaline earth metal chloride is calcium chloride.

4. A method for the recovery of silicon from a reaction mixture comprising silicon and an alkali metal fluoride as defined in claim 3 wherein the aqueous solution of calcium chloride comprises water and from 5% by weight to an amount of calcium chloride that is sufficient to saturate the aqueous mixture.

5. A process for the recovery of silicon from a reaction mixture which comprises silicon and an alkali metal fluoride as defined in claim 3 wherein the pH is adjusted to between 1 and 5 with an acid selected from the group consisting of hydrochloric, hydroiodic, perchloric, nitric and hydrobromic.

6. A process for the recovery of silicon from a reaction mixture which comprises silicon and an alkali metal fluoride as defined in claim 4 which includes the steps of:

(a) adding an amount of an aqueous solution of acidified calcium chloride to a reaction mixture of silicon and sodium fluoride which provides a stoichiometric excess of calcium ion based on the total amount of fluoride ion to form an aqueous slurry;

(b) allowing the sodium fluoride in said aqueous slurry to react with calcium chloride to form insoluble calcium fluoride;

(c) separating the silicon from said slurry by allowing said silicon to settle out by gravity;

(d) removing the slurry by decantation to obtain the silicon; and (e) washing the silicon to remove the residue of calcium fluoride.

7. A process for the recovery of silicon from a reaction mixture which comprises silicon and an alkali metal fluoride as defined in claim 6 wherein the aqueous solution of calcium chloride comprises water and from 5% to an amount of calcium chloride that is sufficient to saturate the solution.

8. A process for the recovery of silicon from a reaction mixture which comprises silicon and an alkali metal fluoride as defined in claim 6 wherein the aqueous solution of calcium chloride contains an acid.

9. A process for the recovery of silicon from a reaction mixture which comprises silicon and an alkali metal fluoride as defined in claim 7 wherein the acid is hydrochloric acid.

* * * * *